(No Model.) 3 Sheets—Sheet 1.
E. A. SMITH.
DRAG SAW MACHINE.
No. 553,545. Patented Jan. 28, 1896.
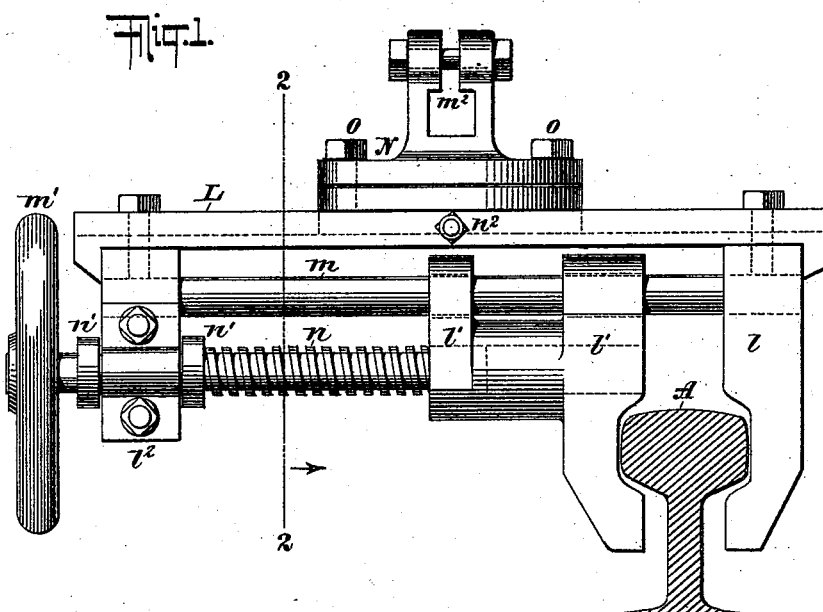
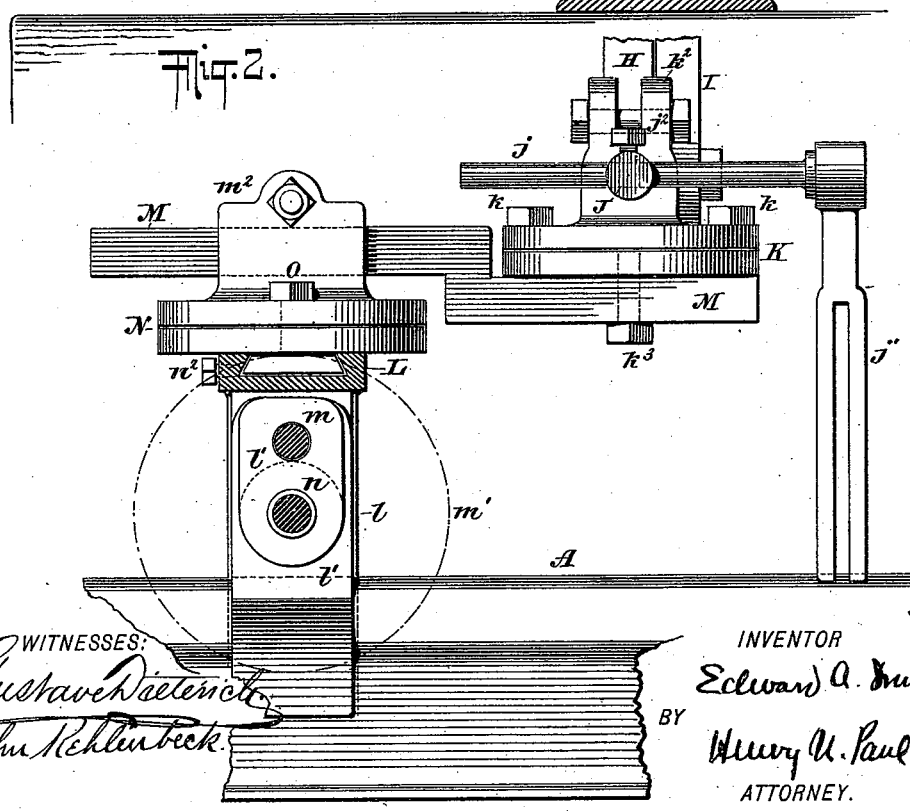
WITNESSES:
Gustave Dieterich
John Rehlenbeck
INVENTOR
Edward A. Smith
BY
Henry U. Paul Jr.
ATTORNEY.

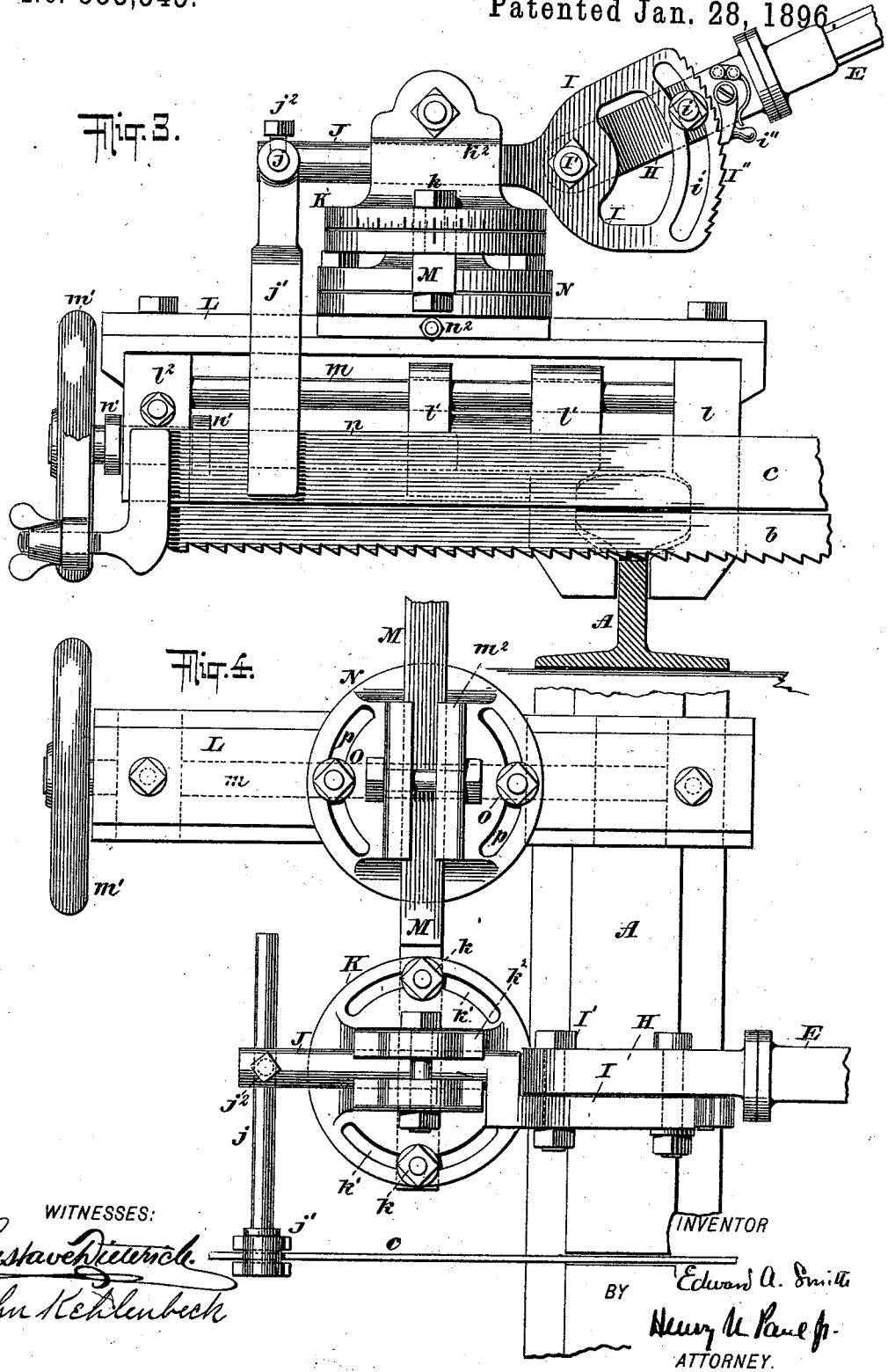

(No Model.) 3 Sheets—Sheet 3.

E. A. SMITH.
DRAG SAW MACHINE.

No. 553,545. Patented Jan. 28, 1896.

WITNESSES:
Gushave Dieterich
John Kehlenbeck

INVENTOR
Edward A. Smith
BY Henry U. Paul Jr.
ATTORNEY.

United States Patent Office.

EDWARD A. SMITH, OF NEW YORK, N. Y., ASSIGNOR OF TWO-THIRDS TO PATRICIUS McMANUS AND WILLIAM FARRAR SMITH, OF PHILADELPHIA, PENNSYLVANIA.

DRAG-SAW MACHINE.

SPECIFICATION forming part of Letters Patent No. 553,545, dated January 28, 1896.

Application filed December 19, 1894. Serial No. 532,315. (No model.)

*To all whom it may concern:*

Be it known that I, EDWARD A. SMITH, a citizen of the United States, residing in the city of New York, in the State of New York, have invented certain new and useful Improvements in Drag-Saw Machines, whereof the following is a specification, reference being had to the accompanying drawings.

My invention relates to a drag-saw machine which may be used generally for cutting beams, girders or bars of iron or steel, but especially adapted to cutting steel rails.

It consists, generally speaking, of a saw the frame of which is mounted and guided so that it can swing only in one predetermined plane, but with mountings so adjustable that this plane may be taken in any direction in order that the saw may cut the rail or other object either in a line at right angles or diagonally to its length, and may make either of these cuts as an undercut or an overcut.

Figure 5:
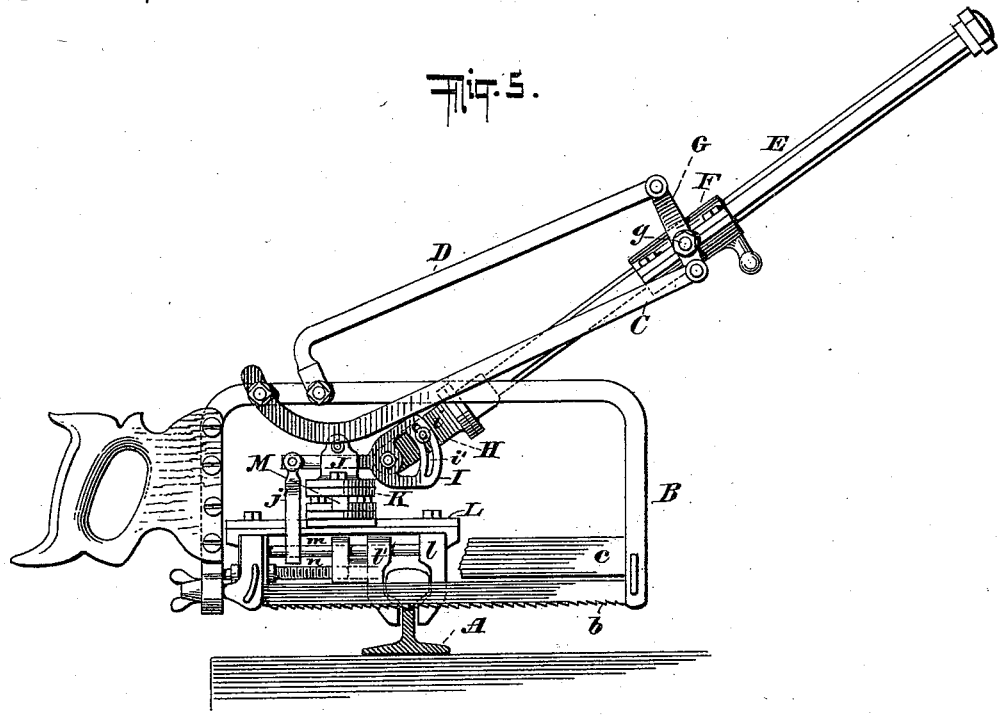
Figure 6:
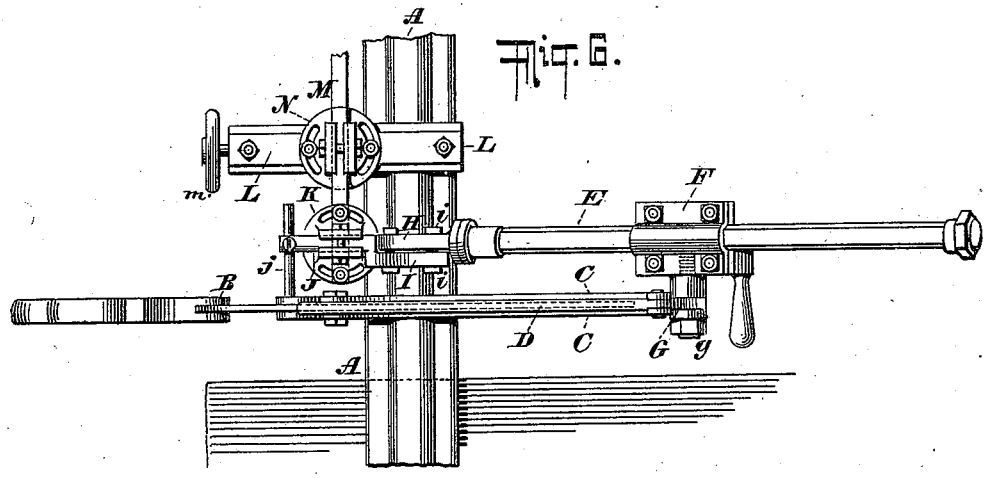

In the accompanying drawings, Figure 1 is a side elevation of the basal portion of the machine, the other parts being removed and the rail to which it is clamped being shown in section. Fig. 2 is a cross-section of the same portion through the line 2 2, Fig. 1, certain parts of the guiding mechanism being added thereto in elevation. Fig. 3 is an end elevation of the parts seen in Fig. 2 with the addition of a portion of the saw. Fig. 4 is a plan view of the same. Fig. 5 is an end elevation of the entire machine with the saw in position to cut a rail, which is shown in section. Fig. 6 is a plan view of the same.

My invention is illustrated as adjusted upon a rail which has been partially cut in a right vertical plane.

A is the rail. To the rail there is clamped a base-plate L, upon which the entire machine is built up and supported. This base-plate carries upon its under side a vise having two parallel jaws $l$ $l'$, which are made in shape to readily clasp a rail or girder. The former of these jaws is fast upon one extremity of the base-plate, while the latter slides along a guide-rod $m$ running between the fixed jaw $l$ and the shoulder $l^2$, fast upon the other extremity of the base-plate. Within a bearing in this shoulder revolves a short shaft turned by the hand-wheel $m'$ and held in position in the bearing between the two fixed collars $n'$ $n'$. Upon this shaft is cut the screw $n$, which enters the movable jaw $l'$, and by its revolution advances or retracts it.

Upon the upper side of the base-plate L is formed a longitudinal slideway. Dovetailed within this slideway plays the swivel-plate N, which may be set in position by the screw $n^2$. The upper disk of this swivel-plate may be adjusted angularly upon the lower disk by means of the slotted arcs $p$ $p$, through which pass screws fast to the lower disk and set by the nuts $o$ $o$. Upon the swivel-plate is carried a square slide-bearing $m^2$ split at the top and with its split sides united by a screw-bolt and nut, by means of which the square slide-rod M, which slides longitudinally within the bearing, may be accurately and firmly adjusted longitudinally.

To the extremity of the slide-rod M there is affixed by the screw $k^3$ a second swivel-plate K, the upper disk of which is similarly adjusted angularly upon the lower disk by means of the slotted arcs $k'$ $k'$, through which pass screws fast to the lower disk and set by the nuts $k$ $k$. Upon this swivel-plate K is carried a circular slide-bearing $k^2$, normally at right angles to the slide-bearing $m^2$ upon the swivel-plate N. It is split at the top, and its split sides are united by a screw-bolt and nut, by means of which the circular slide-rod J, which slides horizontally within the bearing, may be accurately and firmly adjusted either longitudinally or axially. One extremity of the slide-rod J expands into the fan-plate I, to which is pivoted by the bolt I' the flattened base H of the guide-bar E. The angle which this guide-bar makes with the horizontal slide-rod J may be adjusted within certain limits by means of the slotted arc $i'$, cut in the fan-plate I, within which plays a screw-bolt $i$, the nut of which sets the guide-bar at the desired angle. The adjustment is further facilitated by a series of teeth $I^2$, cut upon the peripheral arc of the fan-plate, with which engages a spring-pressed detent $i^2$, pivoted to the base of the guide-bar. The guide-bar is preferably tubular and hexagonal or octagonal in cross-section. Along it runs the slide-block F, which surrounds the bar and is split into two parts, which may be tightened or loosened upon the bar by means of screws and bolts, by which its two portions are united. It carries a handle, and from one side projects at right angles to its line of motion along the guide-bar a pivot $g$, upon which swings centrally the cross-piece G. To the upper and lower extremities of this cross-piece are respectively pivoted the connecting-rods D and C. These rods are approximately parallel to each other and are pivoted at their lower extremities to the upper cross-piece of the saw-frame B, the upper rod reaching said cross-piece from above and the lower one being forked at its lower extremity and receiving the cross-piece between its forks and curving slightly upward to its pivot, which is near the pivot of the former.

The saw-frame B is of the usual construction. It carries between its arms the saw $b$, which is tightened by a small thumb-screw. It also carries immediately above the saw and parallel to it a guide $c$.

Through that end of the slide-rod J which is opposite the pivoted extremity of the guide-rod E passes a slide-rod $j$, at right angles to the first and adjustable within it by the set-screw $j^2$. At its extremity is carried a depending forked arm $j'$, between the forks of which the guide $c$ of the saw-frame runs, and is guided with great accuracy.

The operation of my device is as follows: The machine is clamped by means of the vise upon the rail or girder which is to be cut. More accurate longitudinal adjustment is secured by sliding the square slide-rod M within the bearing carried by the swivel-plate N. If a right-angle cut is to be made both the swivel-plates N and K are adjusted as seen in Figs. 4 and 6, so that the slide-rod M is parallel to the object to be cut, and the slide-rod J at right angles thereto. The circular slide-rod J is clamped within its bearings at the proper angle to bring the pivot I', upon which the guide-bar swings, parallel to the object to be cut. The guide-bar is then adjusted by means of the screw-bolt $i$, either horizontally or slightly raised vertically therefrom, the object of raising it being to increase the cutting power of the saw by causing the weight and friction of the slide-block F to bear down against the forward motion of the saw. If the guide-bar is horizontal, the position of the connecting-rods C and D upon the cross-piece G, and of the latter upon the slide-block, may be set at their pivoted joints in such position that the saw is compelled to move only in a horizontal line. The forked arm $j'$ is adjusted over the guide $c$ of the saw-frame and serves to insure still greater accuracy in the motion of the saw during the commencement of the cut, and until the saw has sunk sufficiently far into the object to be cut for the guide to fall out of reach of the forks. If the saw itself has sufficient width the guide $c$ may be omitted, as the forked arm fitting over the back of the saw will then guide it with sufficient accuracy.

If instead of a right-angle cross-cut a diagonal one is to be made, the requisite adjustment is made upon either one or both of the swivel-plates M and K. Under ordinary circumstances it is preferable that the adjustment be made only upon the latter, and for this purpose it is shown in Fig. 3 as divided around its edge into degrees of arc, so that the angle of the cut may be read off therefrom. In case an undercut or overcut is desired, the circular slide-rod J is turned upon its own axis within its bearing, and set at the proper angle by the screw-bolt and nut uniting the split sides of the bearing.

The device is shown in the drawings and has been described thus far in its most complete and elaborate shape. It may be simplified without departing from the principle of my invention. Thus the form of the vise may be varied. Instead of the two swivel-plates N and K, united by the slide-bar M, one only may be employed—that is to say, the swivel-plate K may be mounted directly upon the base-plate L. In this case the longitudinal adjustment is obtained by altering the position of the vise. The method of connecting the saw-frame to the slide-block may be varied. The cross-piece G may be omitted and the connecting-rods D and C pivoted directly to the slide-block; or one of the connecting-rods may be omitted and the connection with the saw-frame be effected by a single connecting-rod pivoted to each.

Having thus described my invention, I claim—

1. In a drag-saw machine, the combination of a vise capable of clamping the object to be cut; a swivel plate mounted upon said vise; means for adjusting the said swivel plate in relation to said vise, both in the direction parallel with, and at right angles to, the direction of the motion of the jaws of the vise; a reciprocating saw-frame and saw; and suitable connections mounted on the swivel plate which restrict the reciprocation of the saw-frame to a predetermined plane, substantially as set forth.

2. In a drag-saw machine, the combination of a vise capable of clamping the object to be cut; a guidebar mounted upon the vise; a slide block playing along said guide-bar, but restrained from rotation thereon; and a reciprocating saw-frame and saw connected only with the slide block by connections which restrain the reciprocation of the saw-frame to a predetermined plane, substantially as set forth.

3. In a drag-saw machine, the combination of a vise capable of clamping the object to be cut; an inclined guide bar mounted upon the vise; adjustments between the vise and the guide bar which admit of universal motion in a horizontal plane while maintaining the guide-bar always in a line parallel to its original position; a slide-block playing along the guide-bar; a reciprocating saw-frame and saw; and suitable connections between the slide-block and saw-frame which restrict the reciprocation of the saw-frame to a predetermined plane, substantially as set forth.

4. In a drag-saw machine, the combination of a vise; a guide bar which the vise clamps to the object to be cut; a series of adjustments between the guide-bar and the vise; a slide block playing along the guide-bar; a reciprocating saw-frame and saw; pivoted connections between the slide-block and the saw-frame which restrict the reciprocation of the saw-frame to predetermined plane; a fork mounted upon said vise which receives the guide or saw of the saw-frame; and adjustments between the fork and the vise whereby the fork may be adjusted to correspond with the said predetermined plane of reciprocation, substantially as described.

5. In a drag-saw machine, the combination of a vise adapted to clamp the object to be cut; a bearing mounted upon said vise in which revolves axially a rod to which is attached a guide-bar; a slide block playing along the guide bar; a saw-frame; suitable connections between the slide block and the saw-frame which restrict the reciprocation of the saw-frame to a predetermined plane; a fork mounted adjustably upon said rod which receives the saw between its arms and increases the accuracy of its motion, substantially as set forth.

6. In a drag-saw machine, the combination of a vise capable of clamping the object to be cut; a swivel plate mounted upon said vise; a bearing mounted upon said swivel plate; a slide rod playing longitudinally within said bearing; a second swivel plate mounted upon said slide rod; a guide bar adjustably mounted upon said second swivel plate; a slide block playing along said guide bar; a reciprocating saw-frame and saw; and suitable connections between the slide block and the saw-frame which restrict the reciprocation of the saw-frame to a predetermined plane, substantially as set forth.

7. In a drag-saw machine, the combination of a vise capable of clamping the object to be cut; a swivel plate mounted upon said vise; a bearing mounted upon said swivel plate; a slide rod playing longitudinally within said bearing; a second swivel plate mounted upon said slide rod; a bearing mounted upon said second swivel plate; a slide rod within said last mentioned bearing; a guide bar pivoted to said last mentioned slide rod; a slide block playing along said guide bar; a reciprocating saw-frame and saw; and suitable connections between the slide block and saw-frame which restrict the reciprocation of the saw-frame to a predetermined plane, substantially as set forth.

EDWARD A. SMITH.

Witnesses:
C. AUGUSTUS DIETERICH,
JOHN KEHLENBECK.